(12) United States Patent
Wang

(10) Patent No.: US 7,782,985 B2
(45) Date of Patent: Aug. 24, 2010

(54) AUTOMATIC FREQUENCY OFFSET COMPENSATION IN A TDD WIRELESS OFDM COMMUNICATION SYSTEM

(75) Inventor: Haitao Wang, Shanghai (CN)

(73) Assignee: Adaptix, Inc., Carrollton, TX (US)

( * ) Notice: Subject to any disclaimer, the term of this patent is extended or adjusted under 35 U.S.C. 154(b) by 725 days.

(21) Appl. No.: 11/651,249

(22) Filed: Jan. 9, 2007

(65) Prior Publication Data

US 2008/0137563 A1 Jun. 12, 2008

(30) Foreign Application Priority Data

Dec. 11, 2006 (CN) .................. 2006 1 0162310

(51) Int. Cl.
*H04K 1/10* (2006.01)
*H04L 27/28* (2006.01)
(52) U.S. Cl. ........................ 375/344; 375/260
(58) Field of Classification Search ......... 375/259–260, 375/340, 342, 344; 370/280–282, 278; 455/75, 455/136, 192.1, 192.2
See application file for complete search history.

(56) References Cited

U.S. PATENT DOCUMENTS

| | | | |
|---|---|---|---|
| 5,479,447 A | 12/1995 | Chow et al. |
| 5,504,775 A | 4/1996 | Chouly et al. |
| 5,515,378 A | 5/1996 | Roy, III et al. |
| 5,555,268 A | 9/1996 | Fattouche et al. |
| 5,708,973 A | 1/1998 | Ritter |
| 5,726,978 A | 3/1998 | Frodigh et al. |
| 5,734,967 A | 3/1998 | Kotzin et al. |
| 5,886,988 A | 3/1999 | Yun et al. |
| 5,887,245 A | 3/1999 | Lindroth et al. |
| 5,914,933 A | 6/1999 | Cimini et al. |
| 5,933,421 A | 8/1999 | Alamouti et al. |
| 5,956,642 A | 9/1999 | Larsson et al. |
| 5,961,603 A | 10/1999 | Kunkel et al. |
| 5,973,642 A | 10/1999 | Li et al. |
| 5,991,273 A | 11/1999 | Abu-Dayya |
| 6,005,876 A | 12/1999 | Cimini, Jr. et al. |
| 6,026,123 A | 2/2000 | Williams |
| 6,041,237 A | 3/2000 | Farsakh |
| 6,052,594 A | 4/2000 | Chuang et al. |
| 6,061,568 A | 5/2000 | Dent |
| 6,064,692 A | 5/2000 | Chow |
| 6,064,694 A | 5/2000 | Clark et al. |
| 6,067,290 A | 5/2000 | Paulraj et al. |
| 6,108,374 A | 8/2000 | Balachandran et al. |
| 6,131,016 A | 10/2000 | Greenstein et al. |
| 6,144,696 A | 11/2000 | Shively et al. |

(Continued)

OTHER PUBLICATIONS

International Search Report and Written Opinion issued for PCT/US2007/086340; Dated: May 1, 2008; 10 Pages.

*Primary Examiner*—Jean B Corrielus
(74) *Attorney, Agent, or Firm*—Fulbright & Jaworski L.L.P.

(57) ABSTRACT

Offsets in the transmit clock in a wireless communication system are corrected by using data distributed over many frequencies. In the time domain the system uses separate copies of the same signal transmitted with a known spacing in terms of transmit clock signals. The variation of timing between the received signals yields an initial estimate that then is used in a closed loop tracking arrangement to yield and compensate for unpredictable rate changes caused by, for example, jitter, Doppler or thermal drift. The frequency offset for one channel can then be used to calculate the offset for other channels.

20 Claims, 3 Drawing Sheets

U.S. PATENT DOCUMENTS

| | | | |
|---|---|---|---|
| 6,175,555 B1 | 1/2001 | Hoole | |
| 6,226,320 B1 | 5/2001 | Hakkinen et al. | |
| 6,282,683 B1 | 8/2001 | Dapper et al. | |
| 6,337,782 B1 | 1/2002 | Guerin et al. | |
| 6,366,195 B1 | 4/2002 | Harel et al. | |
| 6,377,632 B1 | 4/2002 | Paulraj et al. | |
| 6,377,782 B1 | 4/2002 | Bishop et al. | |
| 6,477,158 B1 | 11/2002 | Take | |
| 6,480,521 B1 | 11/2002 | Odenwalder et al. | |
| 6,549,583 B2 * | 4/2003 | Crawford | 375/260 |
| 6,633,616 B2 * | 10/2003 | Crawford | 375/326 |
| 6,940,827 B2 | 9/2005 | Li et al. | |
| 7,088,787 B2 * | 8/2006 | Wang et al. | 375/316 |
| 7,103,116 B2 * | 9/2006 | Thompson et al. | 375/340 |
| 7,123,670 B2 * | 10/2006 | Gilbert et al. | 375/344 |
| 7,133,479 B2 * | 11/2006 | Lee | 375/354 |
| 7,184,495 B2 * | 2/2007 | Thomson et al. | 375/340 |
| 7,203,255 B2 * | 4/2007 | Wang et al. | 375/340 |
| 7,308,063 B2 * | 12/2007 | Priotti | 375/362 |
| 7,362,812 B1 * | 4/2008 | Hou et al. | 375/260 |
| 7,366,255 B1 * | 4/2008 | Hwang et al. | 375/324 |
| 7,539,125 B2 * | 5/2009 | Kao et al. | 370/208 |
| 7,539,241 B1 * | 5/2009 | Dick | 375/152 |
| 2002/0026645 A1 | 2/2002 | Son et al. | |
| 2003/0067890 A1 | 4/2003 | Goel et al. | |
| 2003/0169824 A1 | 9/2003 | Chayat | |
| 2003/0231728 A1 | 12/2003 | Phang et al. | |
| 2004/0042385 A1 | 3/2004 | Kim et al. | |
| 2005/0201268 A1 | 9/2005 | Aoki et al. | |
| 2005/0213689 A1 * | 9/2005 | Matsuda et al. | 375/324 |
| 2006/0176802 A1 | 8/2006 | Ko et al. | |
| 2006/0239370 A1 * | 10/2006 | Mody et al. | 375/260 |
| 2008/0232497 A1 * | 9/2008 | Hart et al. | 375/260 |

* cited by examiner

AUTOMATIC FREQUENCY OFFSET COMPENSATION IN A TDD WIRELESS OFDM COMMUNICATION SYSTEM

CROSS-REFERENCE TO RELATED APPLICATIONS

This application is related to and claims priority to Chinese Application No. 200610162310.9 filed Dec. 11, 2006 entitled "AUTOMATIC FREQUENCY OFFSET COMPENSATION IN A TDD WIRELESS OFDM COMMUNICATION SYSTEM", the disclosure of which is hereby incorporated herein by reference. The present application is also related to U.S. Pat. No. 6,940,827, issued Sep. 6, 2005, entitled "COMMUNICATION SYSTEM USING OFDM FOR ONE DIRECTION AND DSSS FOR ANOTHER DIRECTION", which is hereby incorporated by reference herein.

TECHNICAL FIELD

The present invention relates generally to digital data transmission, and more particularly to improved methods and apparatus for providing compensation responsive to frequency offsets of a received TDD/OFDM sub-carrier.

BACKGROUND OF INVENTION

Time division duplex (TDD) applies time-division multiple access (TDMA) principles to two way communications, whereby the time domain is divided into separate repetitive time slots for forward and return signals. Time division duplex has a strong advantage in the case where the asymmetry of the uplink and downlink data speed is variable. As the amount of uplink data increases, more bandwidth (i.e., more time) can be allocated and as the uplink data shrinks the additional time can be used in the other direction. Another advantage is that the uplink and downlink radio paths are likely to be very similar in the case of a fixed or slowly moving system. This means that interference mitigation techniques such as spatial diversity and beam forming work well with TDD systems.

Orthogonal frequency-division multiplexing (OFDM), is a complex modulation technique for transmission based upon the idea of frequency-division multiplexing (FDM) where each frequency sub-channel is modulated with a simpler modulation. A single transmitter transmits on many (typically dozens to thousands) different orthogonal frequencies (i.e., frequencies that are independent with respect to the relative phase relationship between the frequencies). OFDM modulation and demodulation are typically implemented using digital filter banks generally using the Fast Fourier Transform (FFT).

This orthogonality theoretically eliminates all interference between the sub-channels. A number of extra useful benefits, particularly multi-path resistance, arise when the data is coded with some Forward Error Correction (FEC) scheme prior to modulation called channel coding. Moreover, by spreading the transmitted information bits among N subcarriers, the duration of each bit can be longer by a factor of N, and the constraints of timing and multi-path sensitivity are greatly relaxed. However, conventional OFDM suffers from time-variations in the channel. These time variances can be thought of as a carrier frequency offset. This is due to the fact that the OFDM subcarriers are spaced closely in frequency and imperfect frequency synchronization causes a loss in subcarrier orthogonality which severely degrades performance.

TDD/OFDM modulation combines the advantages of both transmission technologies. However, especially in applications involving multiple mobile users communicating with the same fixed base station, it should be understood that it is not a simple matter to maintain accurate frequency synchronization between transmissions from multiple moving transmitters, and thus the same modulation technology need not necessarily be used in both directions. As used in this document, TDD/OFDM merely refers to duplex communications systems in which OFDM is used in at least one direction, and in which bursts of data are being transmitted in only some of the available time slots and received in other time slots.

Thus, in TDD/OFDM wireless communications, particularly in a severe mobile environment with weak transmissions, acquisition and maintenance of the required frequency synchronization at the receiver (or equivalently, compensation for any perceived frequency offset between the respective transmit and receive clocks) with the required degree of accuracy poses a number of technical difficulties, which typically result in not only high processing loads, but also loss of useful communication bandwidth at the start of each transmission burst. Moreover, without fast, accurate and reliable frequency synchronization, the potential modulation efficiencies of OFDM are not obtainable in practice. As a result, conventional TDD/OFDM solutions are not able to adapt to the wide ranges of frequency offsets and changes in signal to interference ratio (SINR) that can be expected in at least some mobile environments without introducing additional processing delays and slower convergence, thus severely compromising system efficiency and communication throughput.

BRIEF SUMMARY OF INVENTION

Offsets in the transmit clock in a wireless communication system are corrected by using data distributed over many frequencies. In the time domain the system uses separate copies of the same signal transmitted with a known spacing in terms of transmit clock signals. The variation of timing between the received signals yields an initial estimate that then is used in a closed loop tracking arrangement to yield and compensate for unpredictable rate changes caused by, for example, jitter, Doppler or thermal drift. The frequency offset for one channel can then be used to calculate the offset for other channels.

In accordance with one aspect of the present invention, for each incoming TDD burst at the OFDM receiver, fast and accurate compensation for Frequency Offset is accomplished by means of a two stage process: (1) An Acquisition stage within which Coarse offset is initially determined by time domain correlation of successively sampled copies of a same distinctive pattern of symbols that are offset by a known integer number of symbols, and (2) A subsequent Tracking stage which determines fine frequency offset of an exemplary pilot signal within that same burst.

In one embodiment, time domain auto correlation is performed in the Acquisition stage on each burst preamble using an open loop structure (i.e., without any feedback for detected errors), but preferably does take advantage of predicted (i.e., extrapolated) offset based on historical offset information derived from previously received bursts from the same transmitter. Once a current estimate of coarse offset approximation has thus been obtained, differential correlation in the frequency domain is employed in the fine frequency offset Tracking stage on a known pilot signal, preferably using an adaptive loop gain factor and threshold (upper and lower frequency limits) settings derived from predicted error in the current estimate of the coarse offset obtained in the time domain correlation.

In accordance with another aspect of the invention, a digital OFDM transmitter uses a local transmit clock to transmit during a single burst (1) a pilot signal, (2) at least two copies of a same distinctive pattern of symbols that are offset by a known integer number of symbols, and (3) multiple OFDM sub-channels modulated with digital data. A digital OFDM receiver uses a local receive clock to generate a sequence of digital samples of the received burst. Those received digital samples are then processed in the time domain to estimate a coarse offset between the two sampled copies of the received distinctive symbol pattern. The coarse offset estimate is then used in a closed loop frequency domain tracking stage to determine a fine frequency offset for the pilot signal that is also embedded in the received sequence of digital samples.

Once a fine frequency offset has been determined for a particular portion of the pilot signal, related frequency offset values may be calculated for corresponding portions of each data bearing sub-channel in the same OFDM constellation.

A disclosed embodiment is operable over a relatively wide range of possible frequency offsets, especially during any handover situations when the signal is weak and the expected error is high for the old link, and where there is no reliable historical information on which to accurately predict the offset on the new link, while at the same time achieving convergence more quickly and thus reduce the required processor utilization. This is particularly important in a very noisy condition, for example, in a mobile TDD/OFDM environment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
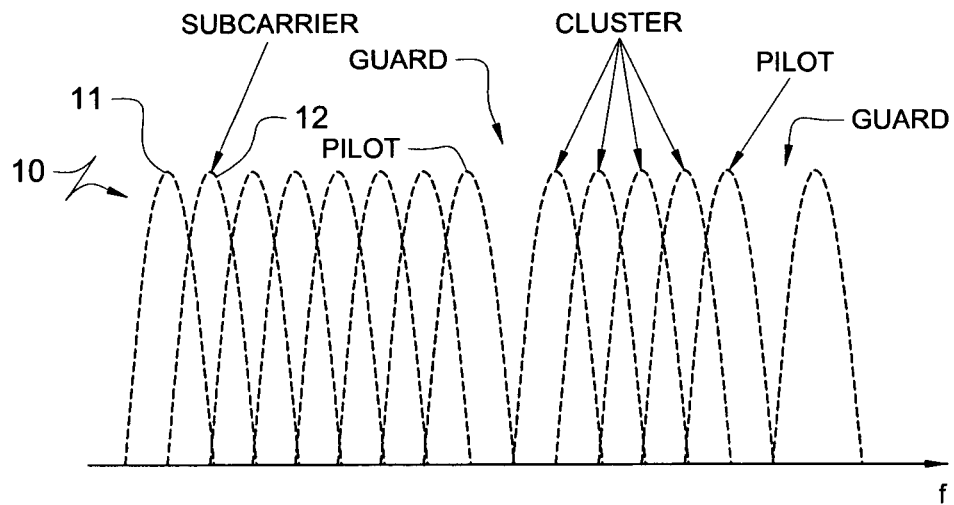
FIG. 1 shows a simplified representation of a received OFDM signal comprising an exemplary constellation of orthogonal subcarrier frequencies.

FIG. 1 shows simplified representation 10 of a received OFDM signal comprising an exemplary constellation of orthogonal subcarrier frequencies. An OFDM transmission comprises a number of mutually orthogonal subcarrier frequencies, (of which two, 11 and 12, are shown) which may be organized into one or more constellations. As is known in the art, a basic unit of digital data transmission is the symbol, and each transmitted symbol represents one or more bits of data. In OFDM, different bits of the same symbol may be transmitted over different subcarriers and some of the subcarriers may not be used to transmit any data symbols, it being a particular advantage of OFDM technology that individual subcarriers may be adaptively selected for transmission and data modulation based on SINR measurements during the course of a transmission session.

In a multiple access variation of OFDM (commonly known as "OFDMA"), the same modulated subcarriers within a single constellation may each include data intended for different recipients. An unused subcarrier frequency may either be transmitted in unmodulated form (in which case it sometimes known as "pilot" signal which provides potentially useful information concerning the transmission environment to any receiver tuned to that frequency) or may not even be transmitted in unmodulated form (in which case it provides a potentially useful "guard frequency" for avoiding interference with other another transmission at a nearby frequency from another transmitter). The IEEE 802.16e-2005 specification, chapter 8.4.14.1 provides tolerance information for the center frequency and symbol clock frequency as no more than 2% of the subcarrier frequency.

Figure 2:
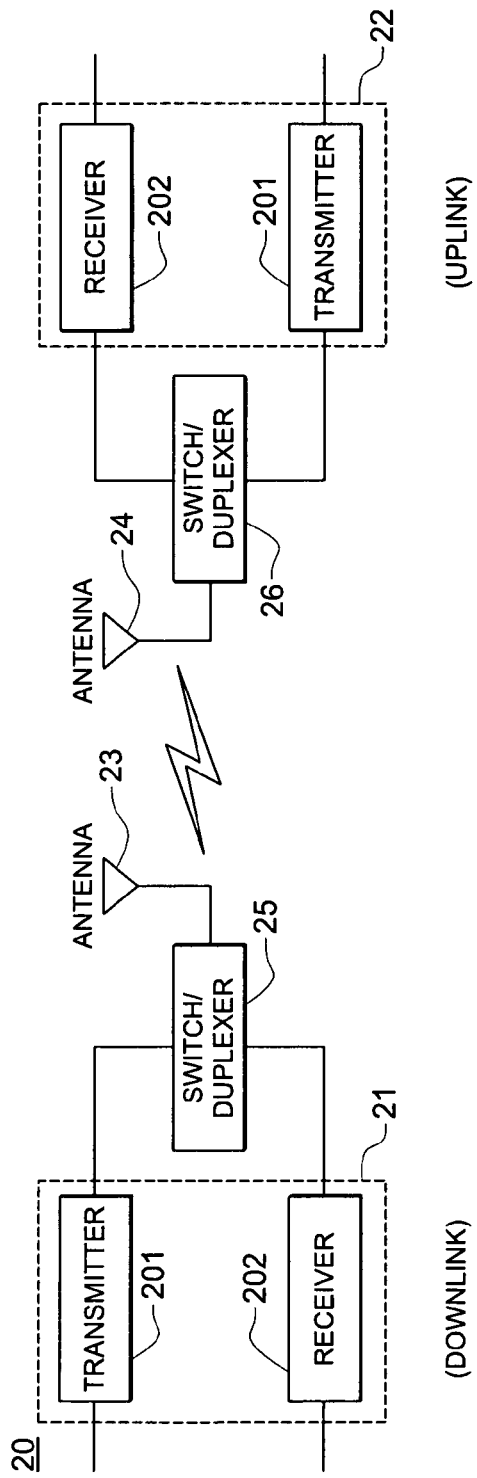
FIG. 2 shows one embodiment of a simple transmission system for transmitting and receiving TDD/OFDMA transmissions in accordance with the present invention.

FIG. 2 shows one embodiment 20 of a simple transmission system for transmitting and receiving TDD/OFDMA transmissions in accordance with the present invention. Each transceiver, 21, 22 in an exemplary TDD system comprises transmitter 201 and receiver 202 coupled to shared antenna, 23, 24, by a duplex switch, such as switch 25, 26. Although not shown in this figure, those skilled in the art will recognize that the same transmitter may transmit to more than one receiver, and that multiple transmitters may transmit to the same receiver. Moreover, although in a simple TDD system only one antenna is required, more sophisticated systems with more complex antenna configurations may be provided at one end of the transmission link, for example at a fixed base station, to take particular advantage of the fact that in a TDD system both transmission and reception take place at different times over essentially the same communication channel and thus share common transmission characteristics.

In the particular example of the TDD/OFDM system depicted in FIG. 2, an "uplink" transceiver includes an OFDM transmitter which shares an uplink antenna with an uplink receiver. An uplink duplex switch alternatively couples the uplink transmitter or the uplink receiver to the uplink antenna in time duplex fashion. Similarly, a "downlink" transceiver includes an OFDM receiver which shares an downlink antenna with a downlink transmitter, and an included downlink duplex switch alternatively couples the downlink transmitter or the downlink receiver to the downlink antenna in time duplex fashion. Moreover, the operation of the two transceivers is coordinated in time such that the OFDM receiver is coupled to the uplink antenna for reception of transmissions over the wireless transmission link at the same time that the OFDM transmitter is coupled to the downlink antenna and transmitting over that same line, preferably in close time synchronization with only a minimal guard time during which there is transmission in either direction.

Although many OFDM systems will use OFDM technology in both directions, those skilled in the art will recognize that the present invention is applicable to systems using OFDM technology in only one direction, with an alternative transmission technology (or even radio silence) in the opposite direction. Accordingly, in FIG. 2, the uplink receiver has not been specifically identified as an OFDM receiver, and the downlink transmitter has not been specifically identified as an OFDM transmitter.

Figure 3:
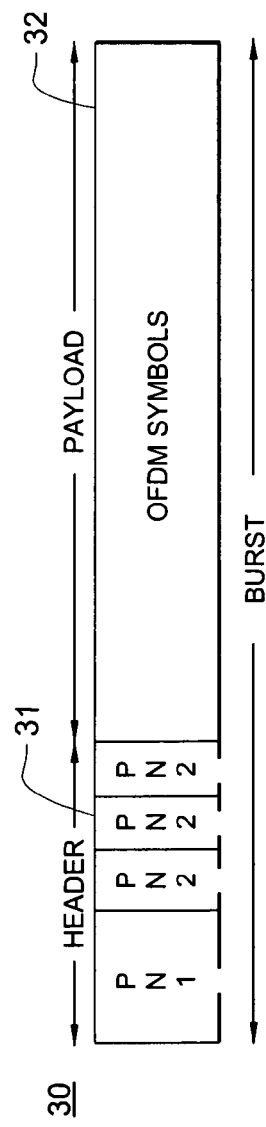
FIG. 3 shows a possible data structure of one embodiment of a burst of a TDD OFDMA transmission.

FIG. 3 shows a possible data structure 30 of one embodiment of a burst of a TDD OFDMA transmission. Regardless of the transmission technology employed, TDD systems typically do not transmit and receive at the same time, but rather transmit only in a "burst" fashion, with each burst including header (or "preamble") portion 31 and data (or "payload") portion 32. Each burst is separated from other bursts from the same transmitter by a relatively long period of radio silence, during which the communication link may be used for other transmissions from other transmitters, including reverse transmissions from the recipient of the transmitted burst. Moreover, in a cellular system having multiple transmitters and receivers, with careful frequency planning and appropriate provision for minimizing interference between concurrent transmissions, even the same subcarrier frequencies may be used in nearby cells for unrelated transmissions from other transmitters that overlap in time with, and potentially are a source of interference to, the particular transmission burst currently being received and processed at the OFDM receiver. For the sake of convenience, any radio system that transmits in burst fashion only during defined transmission intervals, and that does not both transmit and receive at the same time (including a one way transmission system that transmits only during defined burst intervals and that maintains radio salience at other times) will be referred to herein as a TDD system, unless from context it is clear that a fully duplexed (i.e., two way) communication system is intended.

Referring specifically to preamble portion 31 of the TDD burst shown in FIG. 3, it will be seen that a typical burst preamble is used for transmission of overhead data and includes a first portion having a clearly identifiable modulation pattern that marks the beginning of the transmission as well as a second portion having at least one distinctive symbol sequence that typically is modulated with message header information that identifies the particular burst (for example, by source, destination and sequence number). As shown, this distinctive symbol sequence is preferably replicated and more than one copy of that sequence is transmitted during the same burst. This not only provides redundancy that facilitates more accurate recovery of the transmitted header information, but, as will be explained in more detail hereinafter with reference to FIGS. 4 and 5, also provides a possibility of facilitating an initial estimate of possible frequency offset caused by less than perfect synchronization between the local clock at the OFDM transmitter and a second local clock at the OFDM receiver. The cyclic prefix (CP), which is used to reduce to effects of multi-path interference, may also be used to provide redundancy.

Although not shown in this figure, it will be recalled from the prior discussion of FIG. 1 that a pilot signal is typically transmitted over one or more nearby subcarriers. In accordance with the present invention and for reasons that will become clearer from the following discussion of FIGS. 4 and 5, such a pilot signal is preferably transmitted continuously for the entire burst duration, including the payload portion. The data payload portion of the burst may be conventional in format, and will not be discussed in further detail except to note that it preferably includes some form of Forward Error Correction and is possibly interleaved with payload data from other bursts, to better compensate for possible interference caused by reflections of the same transmission over other transmission paths or by other transmissions from other sources. In other embodiments, there may not even be a distinct boundary between the overhead data in the preamble portion and the user data in the payload portion, but rather selected portions of the two types of data may be interleaved with each other, with at least some of the overhead data being thus surrounded by payload data.

Figure 4:
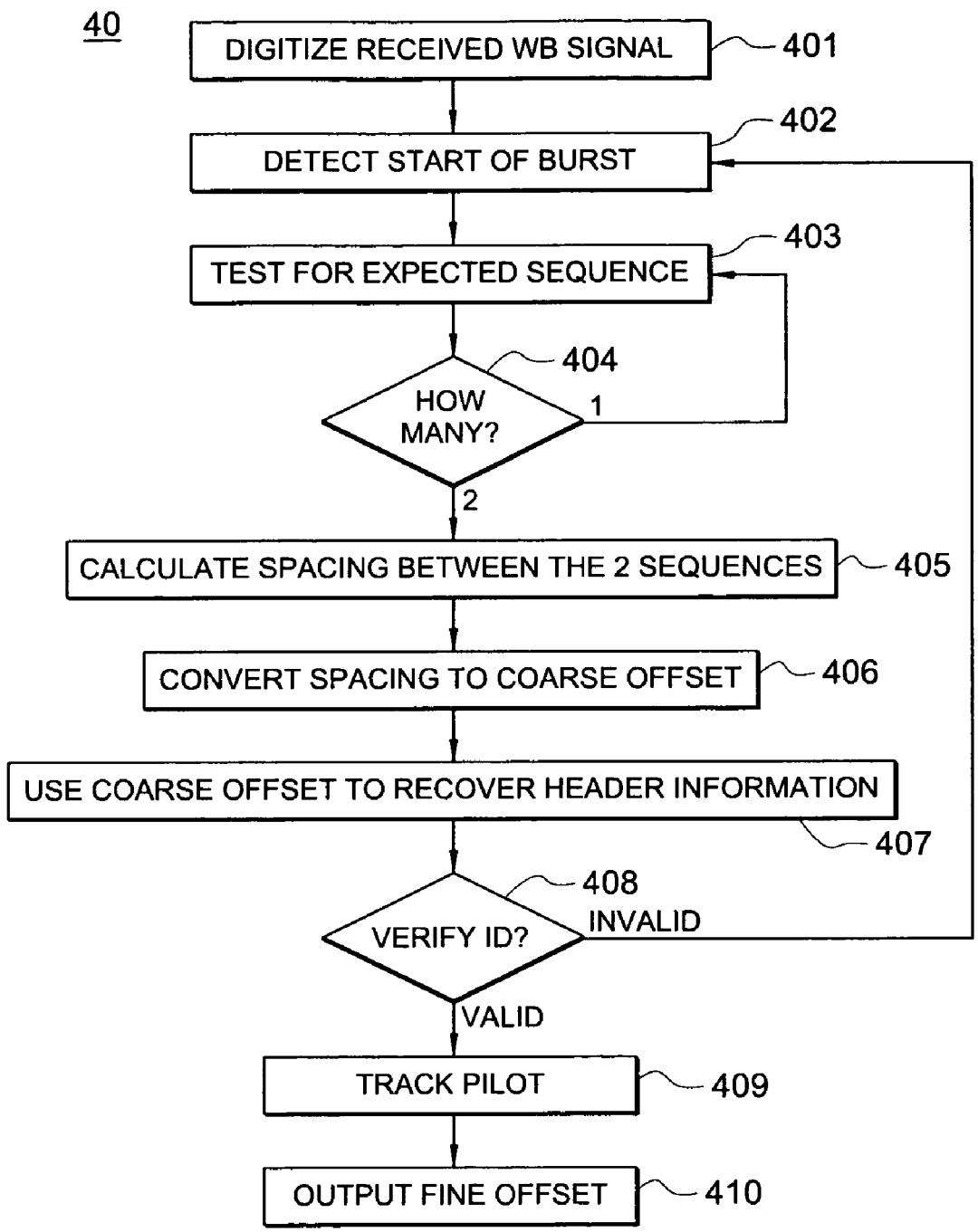
FIG. 4 shows one embodiment of a flow diagram illustrating the operation of a TDD/OFDM frequency offset procedure.

FIG. 4 shows one embodiment 40 of a flow diagram illustrating the operation of a TDD/OFDM frequency offset procedure. Process 401 receives a broadband signal which includes the subcarrier frequencies of interest which are repeatedly sampled to produce a digitized data stream, preferably using a sampling rate that is at least twice the symbol rate of the received data and with a precision that includes at least two bits for each sample, although, particularly when higher modulation levels are contemplated, samples taken at a higher rate and with more precision may be required for accurate recovery of the received data.

Process 402 detects the start of a burst of data (header) and process 403 examines the digitized data stream for the presence of a known modulation pattern that marks the beginning of a OFDM transmission. When such a beginning point is determined, and verified to be more than a single instance, process 404 allows process 405 to calculate the spacing between the expected sequences and from that knowledge, as well as the knowledge of what that spacing started out to be, a time offset can be determined and from that process 406 can convert to a course offset. This course offset is initialized for processing a following slice of the sampled data stream corresponding to the expected burst duration.

Process 406, in one embodiment, uses a digital correlation filter to examine a slice of the sampled data stream for possible occurrences of an expected header data sequence or CP. If a second such sequence is detected within the same slice, the system determines the spacing between what are presumably two copies of the same header data sequence within the same burst. The spacing is preferably measured by counting the number of periods of the local receive clock between two corresponding points in the two sequences (for example, the clock count at which the output from a correlator is at a maximum), in which case the spacing calculation may be a simple subtraction of two clock counts, one corresponding to the sample interval in which a first detection occurred and the other corresponding to the time of the second such detection. Once the spacing between the two received copies has been thus determined, process 407 converts that data into a frequency offset by determining the difference between the measured clock count with a corresponding value for the number of counts of the transmit clock between the transmission of the first copy and the transmission of the second copy, for example by a table look up operation in which frequency offset has been previously calculated for a range of possible spacings.

This particular implementation of a coarse offset detection procedure assumes that a large portion of the entire header data sequence is predictable and accordingly is able to use previously calculated data as a noise free proxy for one of the inputs to the digital correlator. This potentially reduces the relatively difficult task of correlating two distorted and noisy sequences with the somewhat simpler task of performing two correlations with the same noise free proxy that functions as an idealized version of the digitized samples that would be generated by the receiver in response to transmission of the known header data sequence. In particular, such a predicted sample stream may then be used to program a digital correlation filter which outputs a detection trigger whenever a corresponding matching sequence is detected in the incoming digital sample stream. In an alternative embodiment (not shown in detail in the appended drawings), it is not necessary to have advance knowledge of any particular portion of the header data, but only the approximate locations within a received burst which would be occupied by different copies of the same repeated header data sequence or CP. In that case, a digital time domain correlator simply makes multiple comparisons between sample sequences from the two locations, each such comparison employing a different offset between the two sequences, until a possible match is detected and a possible offset is calculated.

The calculated offset may then be used in combination with the start of burst marker to locate and demodulate cell identification data in the burst header, with the lack of a more accurate frequency offset determination being compensated for by the fact that the cell ID information is typically transmitted in a more robust fashion (for example, with fewer modulation levels and/or with more redundancy and at greater interleaving distances) than the payload data, and thus can be accurately recovered without precise knowledge of any relevant frequency offset. Processes 408 and 409 perform this function, for example in the manner to be discussed with respect to FIG. 5.

Due to the fact that the received data has been subjected to noise and distortions, it is unlikely that there will be a perfect match between predicted data and actual data, or between two copies of the same data that are received at different times. Accordingly, rather than simply outputting a binary detection signal, it is advantageous to calculate a probabilistic detection score for each possible offset value, and to declare a match only when the score reaches a threshold (which may be adjusted adaptively based upon whether a previous match trigger was output correctly). Alternatively, it is possible to calculate not only corresponding match probability scores for each sample point in the received data stream, but also will take to advantage of the expected probabilistic variation in the received data to calculate an expected statistical deviation between the calculated most probable match point and other possible match points surrounding that calculated match point.

To further improve the accuracy of the coarse offset calculation, the calculated match point and any related calculations concerning the statistical distribution of other possible match points may be stored for subsequent use during processing of a subsequent data burst. Such historical data may be given greater weight under noisy channel conditions in which the calculated match point is determined to have an associated statistical deviation that is relatively high and the historical data is well within a calculated expected deviation from the uncorrected calculated data. Such historical information may also be extrapolated to calculate a missing match point when no such point has been detected in the current data within a predetermined detection threshold, especially when the accuracy of the historical offset data has been verified and/or adjusted during subsequent processing of the associated data stream.

Having thus obtained a coarse offset value for the current burst from the digitized data stream and verified that the data in question is actually destined for this receiver, that coarse offset may now be used to initialize process 410 which is a fine frequency offset procedure for refining the coarse offset to facilitate a more accurate demodulation of the payload data portion of the received TDD/OFDM burst. In one embodiment such a refinement is performed using a differential correlator operating in a closed frequency domain tracking loop for determining a frequency offset required to synchronize a previously digitized pilot signal transmitted at a known frequency over one sub-channel of the previously sampled OFDM burst with the local clock that had been used to produce those samples.

Those skilled in the art will recognize that the calculated coarse offset information and the calculated fine frequency offset information can be used not only to compensate for frequency offset in the digitized data samples, but also can be used to adjust the rate of the local receive clock to achieve better synchronization between the remote transmit clock and the local receive clock (and thus an expected reduced frequency offset) during processing of subsequent bursts.

Figure 5:
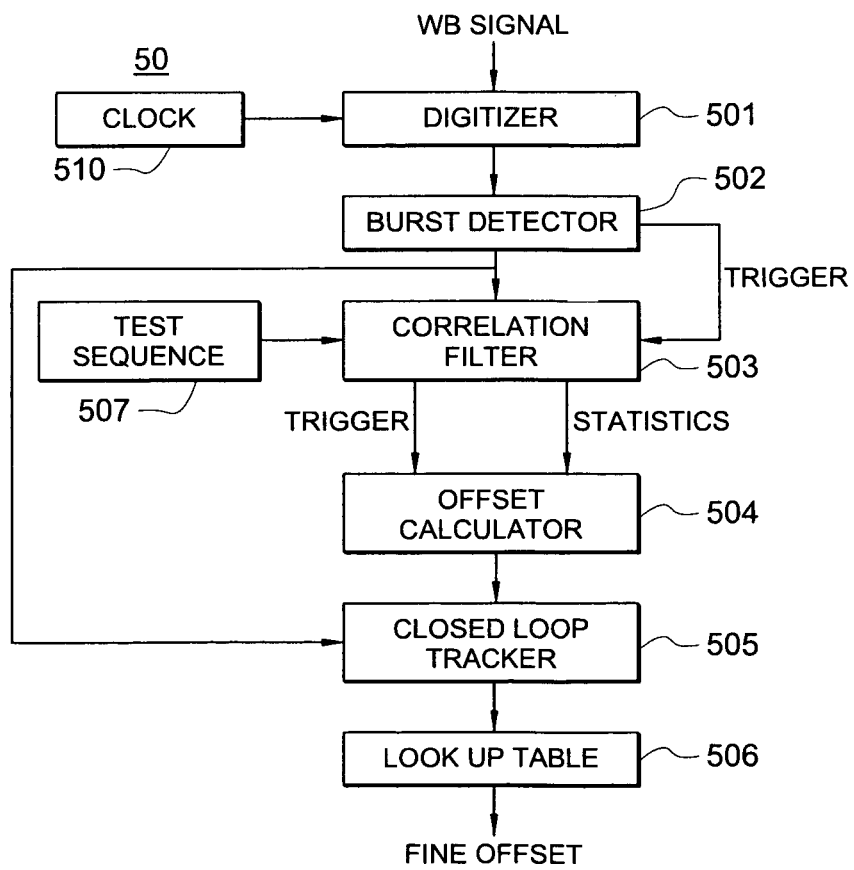
FIG. 5 is a more detailed block diagram of one embodiment of a TDD/OFDM receiver that implements the procedures set forth in FIG. 4 for use in the system of FIG. 3.

Reference should now be made to FIG. 5, which includes an embodiment 50 illustrating a more detailed representation of an OFDM receiver which is constructed in accordance with certain aspects of the present invention. In particular, the receiver includes local clock 510 which supplies timing information to digitizer circuit 501. The digitizer processes a received broadband signal which includes the subcarrier frequencies of interest (possibly processed with conventional analog AGC circuit to a predetermined average amplitude and possibly down converted to an intermediate frequency by conventional analog IF circuitry not shown) to produce a digitized data stream representative of the received broadband signal.

The digitized samples are then processed by burst detection circuit 502 which uses, for example, a digital filter or other means to detect the presence of the known modulation pattern that marks the beginning of a OFDM transmission, to thereby provide a time reference (trigger) that can be used by correlation filter 503 and test sequence 507 during the subsequent recovery of any overhead data and payload data from the remainder of the burst. To that end, a start of burst trigger generated by the burst detection circuit is used to initialize a coarse offset circuit which processes a slice of the sampled data stream corresponding to the expected burst duration to detect each occurrence of the expected header data sequence, and when a second such sequence is detected, determines a coarse offset (which may be measured in periods of the local receive clock) between the two copies. Digital correlation filter 503 outputs a detection trigger whenever a matching sequence is detected in the incoming digital sample stream, relative to a test sequence (via test sequence memory 507) which may be either a calculated replica of a digitized symbol sequence corresponding to the expected header data sequence, or an actual copy of a received data sequence from a designated portion of the received sequence of digitized samples in which a first copy of the expected header data sequence is expected to be present. Preferably, the coarse offset detector outputs not only a binary trigger indicating that the expected copy has probably been detected, but also related statistical information including the probability that such a match has been found and an expected deviation between the calculated most probable match point and other possible match points surrounding that calculated match point.

The calculated match point and any related calculations concerning the statistical distribution of other possible match points, are communicated, for example, to a separate FFT processor such as offset calculator 504, which calculates an initial frequency offset estimate and associated tracking loop gain factor for use in a closed loop frequency domain tracking procedure, for example in closed loop tracker 505. Look up table 506 may be used to convert the calculated frequency offset for the pilot signal sub-channel to corresponding fine offsets for each data bearing channel.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for compensating in a received wireless communication signal frequency offsets caused by imperfect synchronization between a transmit clock used to modulate a burst with a constellation of orthogonal frequency subcarriers and a receive clock used to recover individual subcarriers from the burst, at least some of said subcarriers being modulated with data bearing symbols, the method comprising:
    sampling bursts of received signals at regular intervals; said sampling using said receive clock;
    performing a time domain correlation between two successively sampled copies of a same distinctive pattern of symbols, said two copies being offset in time within a same said burst by a known integer number of symbols, to thereby calculate a measured coarse offset between an expected spacing and a measured spacing;
    performing a frequency domain correlation on a known frequency pilot signal within said burst responsive to said coarse offset to thereby calculate fine frequency offset data for the received pilot signal at various points within said burst; and
    using said calculated fine frequency offset data from the pilot signal, calculating corresponding frequency offsets for other subcarriers frequencies in a constellation containing said burst.

2. The method of claim 1 wherein for each said received burst, the measured coarse offset for that burst is used to establish initial tracking parameters for the frequency domain correlation.

3. The method of claim 1 wherein said communication system is a time-division duplex orthogonal frequency-division multiple access system.

4. The method of claim 3 wherein said time domain correlation is performed in an open loop acquisition stage.

5. The method of claim 2 wherein said frequency domain correlation is performed in a closed loop tracking stage.

6. The method of claim 3 wherein a received time-division duplex orthogonal frequency-division multiple access transmission includes a plurality of time-division duplex orthogonal frequency-division multiple access bursts, and a separate coarse frequency offset is calculated for each said received burst.

7. The method of claim 6 wherein the calculation of a coarse frequency offset for a subsequent received burst is based at least in part on a previously calculated coarse offset for a previously received burst from the same transmitter.

8. The method of claim 6 wherein the calculation of a measured coarse frequency offset for a subsequent received burst is based at least in part on a previously calculated fine frequency offset from a previously received burst from the same transmitter.

9. An apparatus for determining frequency offsets in a received transmission burst caused by imperfect synchronization between a transmit clock used to modulate the burst with a constellation of orthogonal frequency subcarriers and a receive clock used to recover the individual subcarriers from the burst, at least some of said subcarriers being modulated with data bearing symbols, the apparatus comprising:
    a digitizer responsive to a local receive clock for generating a sequence of digital samples of the received burst;
    a digital correlation filter operative in the time domain and responsive to the digital samples for locating within said burst at least two potentially matching sequences of a same distinctive symbol pattern;
    a coarse offset calculator responsive to a measured spacing between said two potentially matching sequences for outputting a coarse offset estimate; and
    a frequency tracker operating in the frequency domain and responsive to said coarse offset estimate for outputting a fine offset estimate derived from a tracking error signal generated within the frequency tracker.

10. The apparatus of claim 9 wherein said frequency tracker is further operable for tracking a pilot signal embedded in the digital samples.

11. The apparatus of claim 10 wherein the digital correlation filter outputs a detection trigger whenever a matching sequence is detected in the incoming digital sample stream.

12. The apparatus of claim 10 wherein the digital correlation filter is responsive to a calculated replica of a digitized symbol sequence corresponding to an expected header data sequence.

13. The apparatus of claim 10 wherein the digital correlation filter is responsive to two data sequences from respective designated portions of the received sequence of digitized samples in which a first and a second copy of the expected header data sequence are expected to be present.

14. The apparatus of claim 10 wherein the coarse offset calculator outputs statistical information concerning said coarse offset estimate and said frequency tracker is responsive to said statistical information.

15. The apparatus of claim 14 where said statistical information includes a probability that such a match has been found and an expected deviation between the calculated most probable match point and other possible match points surrounding that calculated match point.

16. The apparatus of claim 10 further comprising a look up table for converting a fine frequency offset estimate derived from the pilot signal sub-channel to corresponding offsets for the data bearing channels.

17. A mobile time-division duplex orthogonal frequency-division multiple access (TDD-OFDM) system, comprising:
    a digital OFDM transmitter coupled to a local transmit clock for transmitting during a single burst (1) a pilot signal, (2) at least two copies of a same distinctive pattern of symbols that are offset by a known integer number of symbols, and (3) multiple OFDM sub-channels modulated with digital data;

a digital OFDM receiver coupled to a local receive clock to generate a sequence of digital samples of the received burst, said OFDM receiver further comprising:

means operative in the time domain and responsive to said digital samples for locating within said burst said at least two copies of said same distinctive symbol pattern;

coarse offset calculating means responsive to a measured spacing between said at least two copies of said same distinctive pattern of symbols for calculating and outputting a coarse offset estimate;

means operative in the frequency domain on said digital samples and responsive to said coarse offset estimate for estimating a fine frequency offset; and means responsive to said fine frequency offset for recovering said digital data from said digital samples.

18. The system of claim 17 wherein said means operative in the time domain comprises an open loop circuit.

19. The system of claim 18 wherein said means operative in the frequency domain comprises a closed loop circuit.

20. The system of claim 17 wherein the system operates in a noisy environment with multiple transmitters in handover situations when the signal is weak and the expected error is high for the old link, and where there is no reliable historical information on which to accurately predict the offset on the new link.

* * * * *